United States Patent

Pfeifer et al.

[11] 4,090,206
[45] May 16, 1978

[54] METHOD AND APPARATUS FOR PRODUCING SUCCESSIVE LINES OF IMAGE POINTS ON A RECORDING MEDIUM

[75] Inventors: Josef Pfeifer, Unterhaching; Rudolf Paulus, Munich; Walter Gutmann, Lochhofen; Michael Resch, Munich, all of Germany

[73] Assignee: Agfa-Gevaert AG, Leverkusen, Germany

[21] Appl. No.: 815,413

[22] Filed: Jul. 13, 1977

[30] Foreign Application Priority Data

Jul. 15, 1976 Germany .............................. 2631850

[51] Int. Cl.² ........................ G01D 9/42; G03B 41/00
[52] U.S. Cl. .................................... 346/107 R; 346/1; 354/4
[58] Field of Search .................. 346/1, 107 R; 354/4, 354/5, 7

[56] References Cited

U.S. PATENT DOCUMENTS

| | | | |
|---|---|---|---|
| 3,438,057 | 4/1969 | Neitzel | 346/107 R |
| 3,832,488 | 8/1974 | Fahey et al. | 354/7 |
| 3,952,311 | 4/1976 | Lapeyre | 346/107 R X |
| 4,000,495 | 12/1976 | Pirtle | 346/107 R X |

Primary Examiner—George H. Miller, Jr.
Attorney, Agent, or Firm—Michael J. Striker

[57] ABSTRACT

Relative movement is effected between a recording medium and a row of light-emitting diodes (LED's). The row of LED's extends parallel to the direction in which the line of image points to be formed extends, and transverse to the direction of relative movement. Reduced-scale images of the LED's are projected onto the line on the recording medium on which the line of image points is to be formed. The LED's and/or the optical units forming the reduced-scale images are oscillated in a direction parallel to the direction in which the line of image points to be formed extends. Each image of an LED sweeps a straight linear region on the recording-medium line at least equal in length to the distance between adjoining LED's of the LED-row. During each $n^{th}$ half-period of oscillation, a succession of control signals is applied to each LED, determining a succession of adjoining image points which the respective LED forms upon the recording-medium line in question; $n$ is an integer. The resultant line of image points contains a number of image points equal to an integral multiple of the number of LED's in the row of LED's.

7 Claims, 4 Drawing Figures

METHOD AND APPARATUS FOR PRODUCING SUCCESSIVE LINES OF IMAGE POINTS ON A RECORDING MEDIUM

BACKGROUND OF THE INVENTION

The invention relates to a method and apparatus for producing successive transverse lines of image points on the surface of a recording medium. In systems of this type, relative movement is effected between a recording medium and a row of light-emitting elements, for example LED's. The LED's are energized by control signals which determine the image points in a single transverse line of image points to be formed on the recording medium.

A system of this type is disclosed, for example, in Swiss patent No. 568,593. In that system, the number of LED's in the LED-row is equal to the number of image points in the transverse line of image points to be formed on the recording medium. Due to the relatively large dimensions of the individual LED's, the number of LED's which can be contained within a single LED-row, and accordingly the resolution of the resultant image, is quite limited.

SUMMARY OF THE INVENTION

It is a general object of the invention to provide a method and apparatus of the type in question but exhibiting considerably higher image resolution than in prior-art systems.

According to one concept of the invention, this is achieved by projecting reduced-scale images of the individual LED's onto the transverse line of the recording medium on which the transverse line of image points is to be formed. The row of LED's and/or the optical units which project the reduced-scale images are oscillated in a direction parallel to the direction in which the transverse line of image points to be formed extends. Each image of an LED accordingly sweeps over a straight linear region of the recording-medium line in question, the length of this straight linear region being at least equal to the spacing between adjoining LED's within the LED-row.

During each $n^{th}$ half-period of oscillation (n is an integer), a succession of control signals is applied to each LED, determining a succession of adjoining image points to be formed within the straight linear region associated with the respective LED.

Accordingly, during the sweeping of, for example, the LED-row along the recording-medium line in question, a succession of control signals can be applied to each LED with a rate such that the straight linear region of the recording-medium line swept out by each LED image becomes provided with a number of successive adjoining image points corresponding to the desired degree of image resolution.

Thus, using a relatively small number of LED's for the LED-row, a transverse line of image points containing a number of image points much larger than the number of LED's, i.e., a multiple thereof, can be formed. This makes possible a very great increase in image resolution.

According to a preferred concept of the invention, if the oscillatory displacement of the oscillated part of the structure is, for example, sinusoidal, the application of the successions of control pulses to the individual LED's is performed during a middle portion of the oscillatory period of the oscillating structure, during which the rate of change of position of the oscillatory structure is most nearly constant. If this is done, the signals in each succession of control signals can be spaced by identical time intervals, and substantially uniform spacing of the image points of the transverse line of image points to be formed is assured.

According to a preferred concept of the invention, the row of LED's is stationary, and it is the scale-reducing projector lenses which are oscillated to cause the LED images to sweep along the line on which the line of image points is to be formed. In principle, it would be possible to maintain the scale-reducing projector lenses stationary and to instead oscillate the row of LED's; however, because of the scale reduction, a considerably greater amplitude of oscillation would be required. Alternatively, both the row of LED's and also the scale-reducing projector lenses could be oscillated, for example in unison, in which case it is preferred to design the row of LED's and also the plurality of projector lenses as a single structural unit, to facilitate the performance of the oscillatory movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
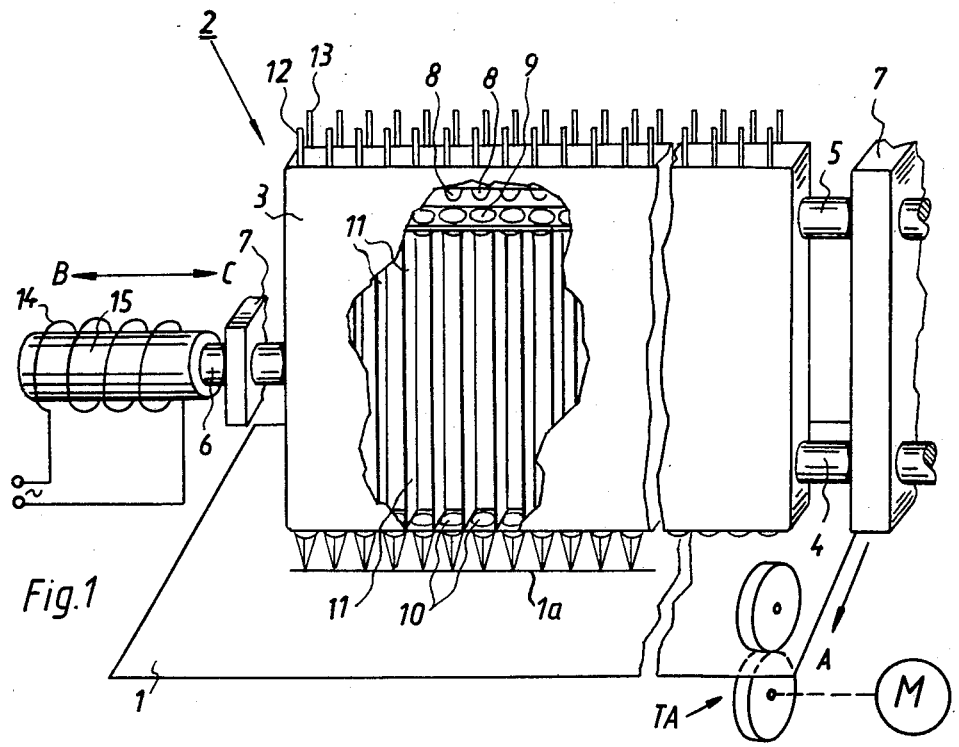
FIG. 1 depicts an exemplary embodiment of the inventive recorder.

In FIG. 1, a transport arrangement TA driven by a motor M transports a light-sensitive sheet 1 in the direction of arrow A past a writing unit 2. The housing 3 of the writing unit 2 is mounted on a framework 7, by means of bearing pins 4, 5, 6, for oscillatory movement in the direction indicated by the double-headed arrow B - C.

83 LED's 8 are mounted in the upper part of housing 3, arranged in a straight row. Each LED 8 is provided with a respective field lens 9 and a respective projector lens 10, which project a reduced-scale image of the LED onto a transverse line 1a on the recording medium 1, on which a transverse line of image points is to be formed; the scale reduction is 10:1. A plurality of light-screening walls 11 forms, together with adjoining walls of the housing 3, a plurality of light chutes, one for each LED 8 of th LED-row, in order to isolate the light paths of the individual LED's from one another. Each LED has two electrical terminals 12, 13. In order to oscillate the writing unit 2, use is made of an oscillatory-motion generator comprising an electromagnetic coil 14 surrounding a core 15 coupled to the bearing pin 6; the coil 14 is energized by means of an A.C. voltage.

As already stated, the images of the individual LED's 8 are projected onto the line 1a on which the line of image points is to be formed with a scale-reduction of 10:1. The writing unit 2 is oscillated, and during the quarter of an oscillatory period between $T_1$ and $T_2$ (see FIG. 2) each LED 8 receives a succession of ten control signals, each of the ten control signals (analog or digital) determining one of ten successive adjoining image points to be formed by the respective LED along the associated part of line 1a. The gaps between the image points which would be formed by adjoining LED's if the writing unit 2 were maintained stationary, are thus filled-in with additional image points. In the exemplary arrangement depicted in FIG. 1, adjoining LED's of the LED-row are spaced apart by 2.54 mm. Accordingly, if ten successive control pulses are applied to each LED during the time interval from $T_1$ to $T_2$, the spacing between adjoining image points in the line of image points which is formed will be 0.254 mm, or about four image points per millimeter. This degree of image resolution is usual in, for example, facsimile recorder systems.

Figure 2:
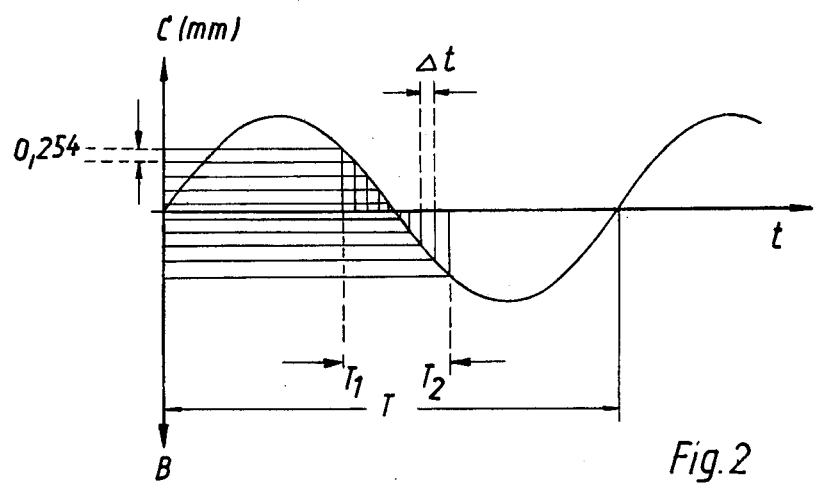
FIG. 2 is a position-versus-time graph illustrating the oscillatory movement of the oscillating part of the recorder.

FIG. 2 is a graph of position-versus-time of the oscillating writing unit 2 of FIG. 1. The amplitude of the oscillatory motion is about 1.6 mm. The frequency of oscillation is 50 1 Hertz, corresponding to an oscillatory period of T = 20 ms. The points on the sinusoidal curve located above the zero-line (the t-axis) correspond to positions of the oscillating writing unit 2 displaced from the middle position thereof in the direction indicated by C in FIG. 1; the points on the sinusoidal curve located below the zero-line (the t-axis) correspond to positions of the oscillating writing unit 2 displaced from the middle position thereof in the direction indicated by B in FIG. 1.

It will be noted that the middle portion of the oscillatory period, from $T_1$ to $T_2$, centered about the zero-throughpass of the sinusoid, is the portion where the rate of change of position of the oscillating structure is most nearly constant, i.e., where the motion of the oscillating structure is most nearly linear. This interval is utilized for the application of ten successive control signals to each LED of the LED-row, the intervals $\Delta t$ between successive control signals in each succession of ten control signals being equal to about 0.5 ms. Accordingly, during this 5 ms of the 20-ms oscillatory period, each individual LED 8 forms ten successive adjoining image points on the recording-medium line 1a. During the remaining 15 ms of the oscillatory period, the recording medium 1 is advanced a distance equal to the spacing between adjoining image lines to be formed.

Figure 3:
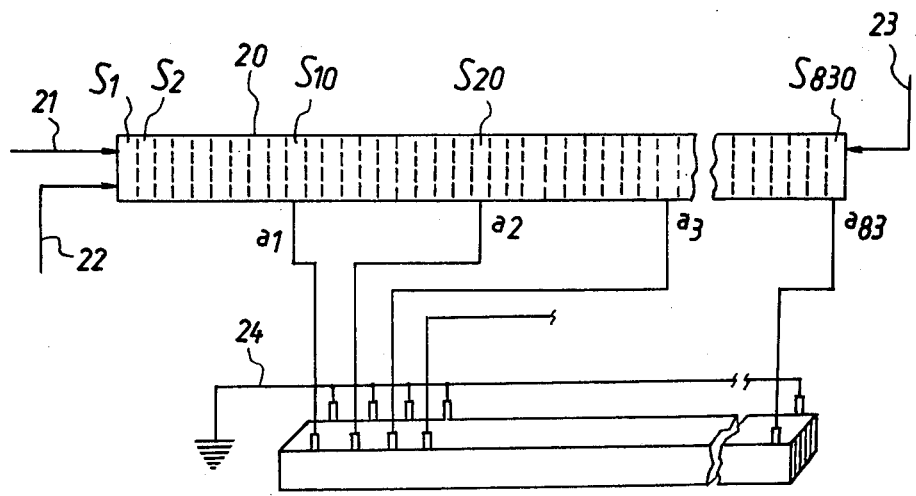
FIG. 3 schematically depicts a control circuit for applying successions of control signals to the individual LED's of the recorder.

FIG. 3 schematically depicts how the 830 control signals corresponding to the 830 image points of a transverse line of image points to be formed on recording-medium line 1a are applied to the individual LED's. Each series of 830 control signals may be furnished, for example, by a facsimile-recorder receiver.

A shift register 20 contains 830 shift-register stages $S_1$ to $S_{830}$, one for each image point of the transverse line of image points to be formed. Each tenth shift-register stage $S_{10}, S_{20}, \ldots, S_{830}$ is provided with a respective parallel-read-out signal-transmission line $a_1, a_2, \ldots, a_{83}$. Each transmission line connects the associated shift-register stage to the first terminal of the associated LED; the second terminals of all the LED's are connected in common to ground, via a line 24.

The 830 control signals corresponding to the 830 image points of one transverse line of image points are entered into the shift register 20 via a serial-write-in line 21. The shift pulses utilized for the write-in operation are applied to shift-pulse input 22, and their repetition frequency is about 10 microseconds, so that the entire write-in operation takes about 8.3 ms. This 8.3-millisecond write-in operation is performed during the part of the oscillation period T in which the oscillating structure is in the process of moving in the direction indicated by C in FIG. 1.

The read-out of the 830 control signals from shift register 20 is performed during the part of the oscillation period T in which the oscillating structure is in the process of moving in the direction indicated by B in FIG. 1, and in particular during the 5-millisecond time interval from $T_1$ to $T_2$ as already mentioned.

First, the control signals stored in shift-register stages $S_{10}, S_{20}, \ldots, S_{830}$ are read out, by applying a read-out pulse to read-out control line 23.

Then, one shift pulse is applied to shift-pulse input 22, causing the control signals stored in the shift register to all shift by one shift-register stage.

Thereupon, another read-out pulse is applied to read-out control line 23.

Then, another shift pulse is applied to input 22, followed by another read-out pulse to line 23, etc.

The repetition period of the shift pulses applied to input 22 during this read-out operation, and likewise the repetition period of the read-out pulses applied to input 23 during the read-out operation, equals 0.5 milliseconds. Accordingly, each individual LED produces ten successive adjoining image points on the line 1a, corresponding to ten successive ones of the 830 control pulses for the line to be formed.

Persons skilled in the art will appreciate that the requisite synchronization between the oscillatory motion, the shift pulses applied to line 21 for write-in and read-out, the read-out pulses applied to line 23, and the step-by-step advancement of the recording medium, can be established in a considerably variety of conventional ways. One write-in operation and one read-out operation is to be performed per stepwise advancement of the recording medium. The stepwise advancement of the recording medium can, for example, be performed using a stepper motor driven by a train of control pulses. The stepper motor control pulses can be derived from the sinusoidal voltage driving coil 14. The exact moment at which write-in shift pulses begin to be applied to input 22, the exact moment at which read-out shift pulses begin to be applied to input 22, and the exact moment at which read-out pulses begin to be applied to input 23 can, for example, be established using photoelectrically detected markings on the oscillating structure itself, or using amplitude detectors responsive to certain values of the A.C. voltage driving coil 14 and indicating that certain points in the oscillatory cycle have been reached (e.g., $T_1$). These synch signals can be used to establish the moments at which the aforementioned pulses begin to be applied. However, a considerable variety of other conventional synchronizing techniques can of course be used.

Figure 4:
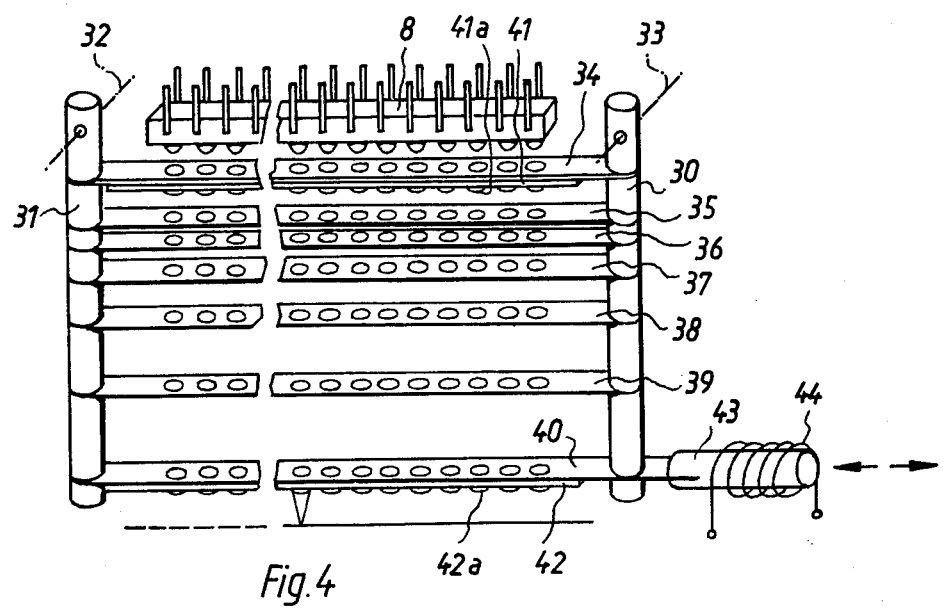
FIG. 4 depicts another embodiment, in which the row of LED's is maintained stationary.

FIG. 4 depicts another embodiment of the invention. Here the row of LED's is stationary, and the optical projecting means is mounted for oscillation relative to the illumination plane of the LED-row. Two pivotably mounted carrier arms 30, 31 are mounted for pivoting motion about stationary pivot axes 32, 33. Carrier arms 30, 31 carry a plurality of aperture plates 34 to 40. The latter form the equivalent of the light chutes in FIG. 1, and serve to isolate the light paths of the individual LED's from one another. Mounted on the bottom side of aperture plate 34 is a row of field lenses 41a; mounted on the bottom side of the aperture plate 40 is a row of projector lenses 42a. Field lenses 41a are preferably lenticular elements of a one-piece lenticular raster 41; likewise, projector lenses 42a are preferably lenticular elements of a one-piece lenticular raster 41. The moving core 43 of an electromagnet 44 energized by an A.C. voltage is coupled to the pivotable carrier arms 33, and serves to oscillate the optical means of the writing unit, while the LED-row itself remains stationary. In all other respects the operation of the embodiment shown in FIG. 4 corresponds to that of the embodiment depicted in FIG. 1.

It will be understood that each of the elements described above, or two or more together, may also find a useful application in other types of constructions and circuits differing from the types described above.

While the invention has been illustrated and described as embodied in a LED recorder which produces lines of image points extending perpendicular to the transport direction of a recording medium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications, without omitting features that, from the standpoint of prior art, fairly constitute essential characteristics of the generic or specific aspects of this inspection.

What is claimed as new and desired to be protected by Letters Patent is set forth in the appended claims.

We claim:

1. A method of forming successive transverse lines of image points on the surface of a recording medium, comprising, in combination, the steps of effecting relative movement between a recording medium and a light-source means in a direction transverse to the direction in which a line of image points to be formed extends, using for the light-source means a row of light-emitting elements extending parallel to the direction in which the line of image points to be formed extends; using optical means to project onto the line on the recording medium on which the line of image points is to be formed reduced-scale images of the light-emitting elements; setting at least one of said means into oscillation in a direction parallel to the direction in which the line of image points to be formed extends and causing each image of a light-emitting element to sweep over a respective straight linear region of the recording medium equal in length to at least the distance between adjoining light-emitting elements of the row; and during each $n^{th}$ half-period of oscillation applying to each light-emitting element a succession of control signals determining a succession of adjoining image points to be formed within the straight linear region associated with the respective light-emitting element, $n$ being an integer.

2. The method defined in claim 1, the application of each succession of control signals to each light-emitting element being performed during a middle portion of the period of oscillation of the oscillating means during which the rate of change of position of the oscillating means is approximately constant.

3. A recorder operative for forming successive transverse lines of image points on the surface of a recording medium, comprising, in combination, light source means; a transport arrangement operative for effecting relative movement between the light source means and the recording medium in a direction transverse to the direction in which a line of image points to be formed extends, the light source means comprising a row of light-emitting elements extending parallel to the direction in which the line of image points to be formed extends; optical means operative for projecting onto the line on the recording medium on which the line of image points is to be formed reduced-scale images of the light-emitting elements; an oscillatory-motion generator operative for oscillating at least one of said means in a direction parallel to the direction in which the line of image points to be formed extends and causing each image of a light-emitting element to sweep over a respective straight linear region of the recording medium equal in length to at least the distance between adjoining light-emitting elements of the row; and control circuit means operative during each $n^{th}$ half-period of oscillation for applying to each light-emitting element a succession of control signals determining a succession of adjoining image points to be formed within the straight linear region associated with the respective light-emitting element.

4. The recorder defined in claim 3, the row of light-emitting elements being stationary, and the oscillatory-motion generator being coupled to the optical means for oscillating the latter.

5. The recorder defined in claim 3, the oscillatory-motion generator being coupled to both the light-source means and the optical means and operative for oscillating both the light-source means and the optical means.

6. The recorder defined in claim 3, the optical means including a plurality of field lenses, each positioned in the light path of a respective one of the light-emitting elements.

7. The recorder defined in claim 3, the light-emitting elements being light-emitting diodes.

* * * * *